Nov. 15, 1966  R. E. STURDIVAN  3,286,133
METER PEDESTAL
Filed Sept. 1, 1964  4 Sheets-Sheet 1
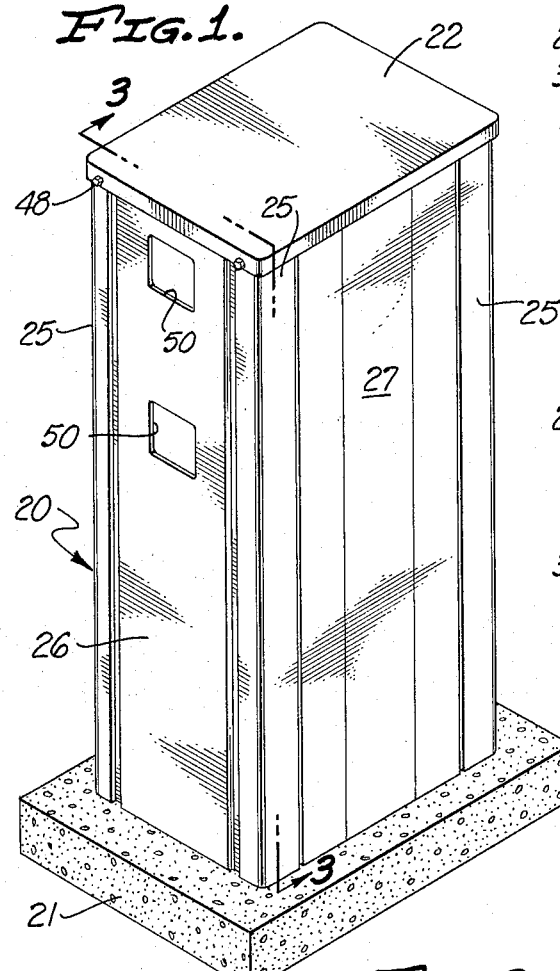
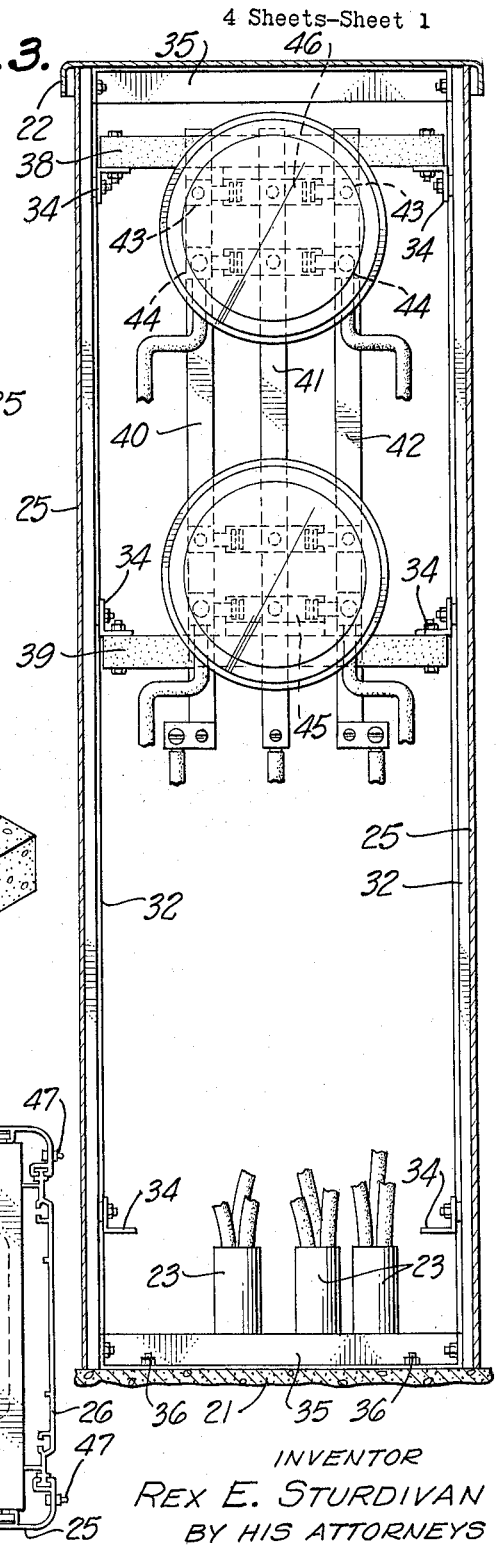
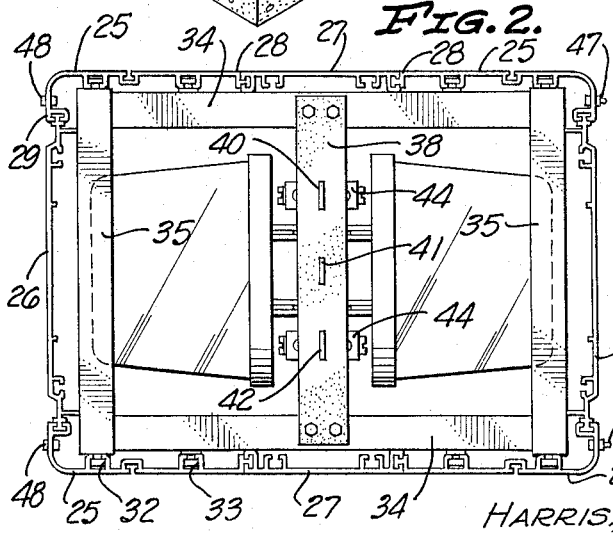
INVENTOR
REX E. STURDIVAN
BY HIS ATTORNEYS
HARRIS, KIECH, RUSSELL & KERN

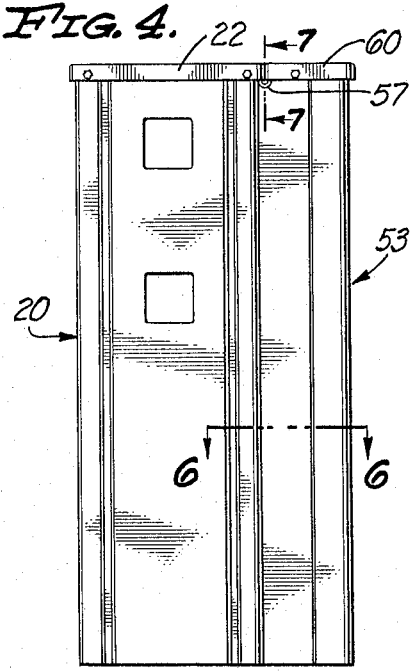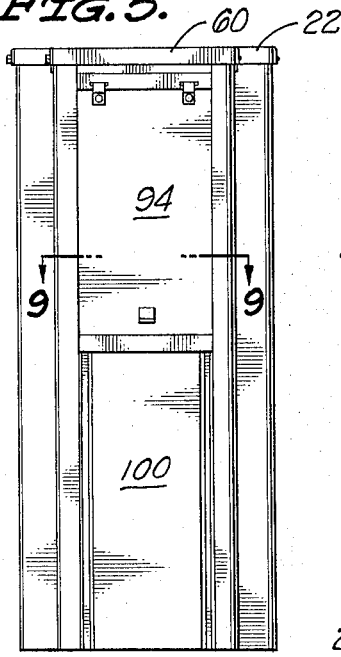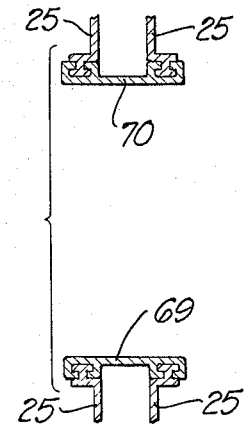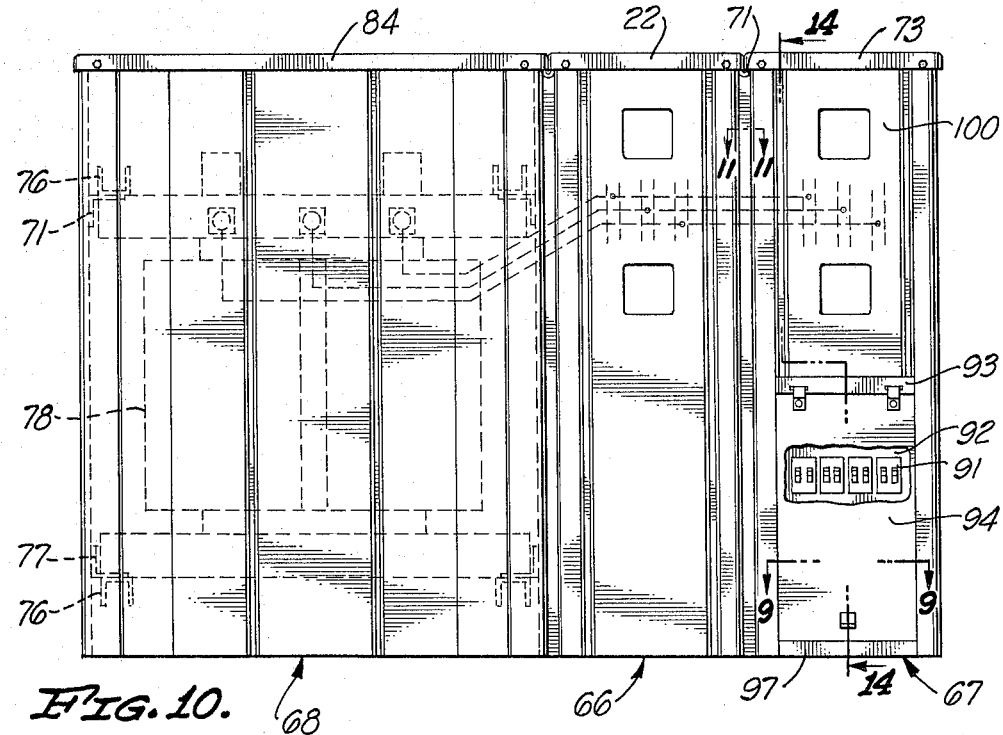

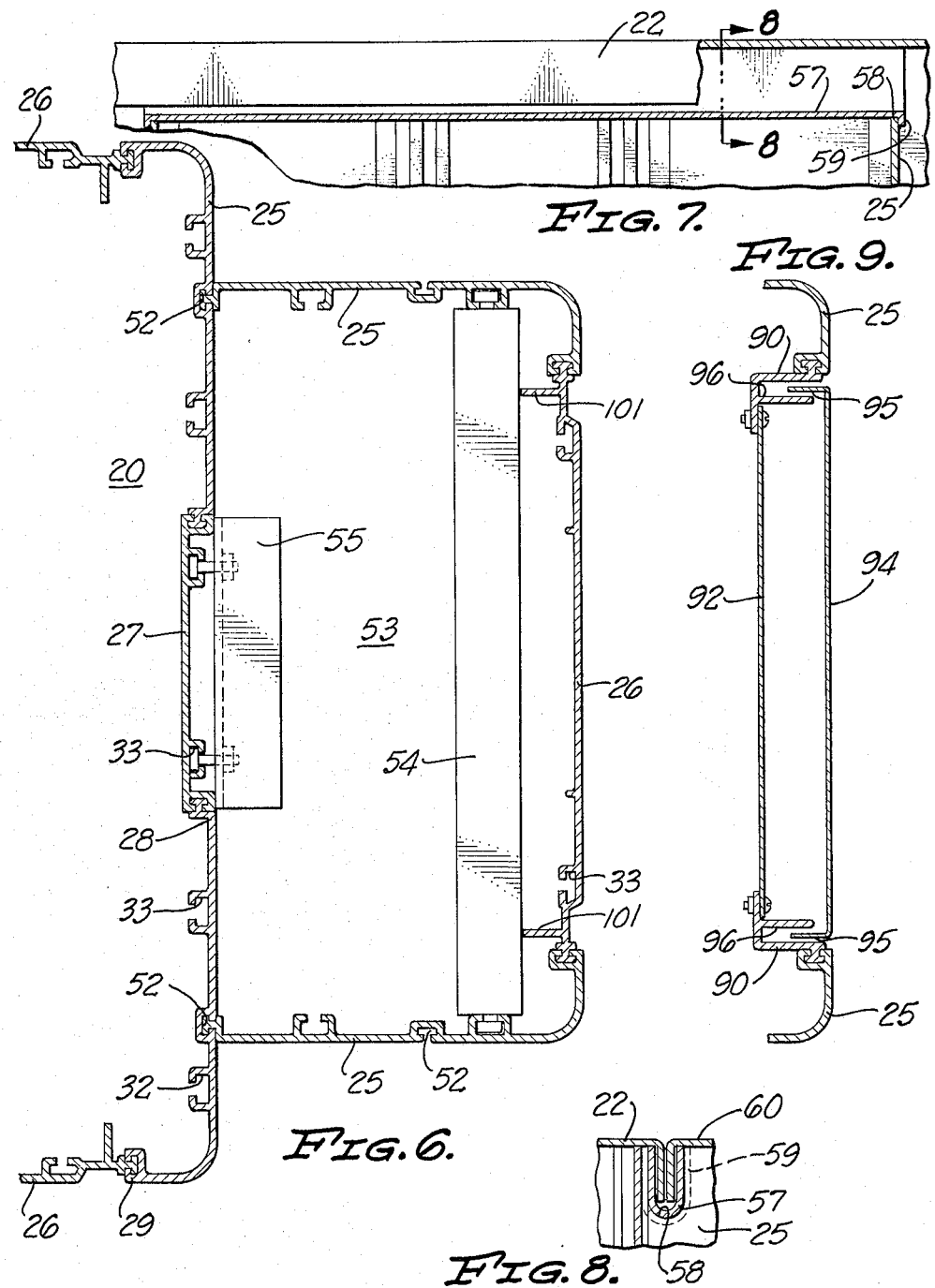

Nov. 15, 1966  R. E. STURDIVAN  3,286,133
METER PEDESTAL
Filed Sept. 1, 1964  4 Sheets-Sheet 4
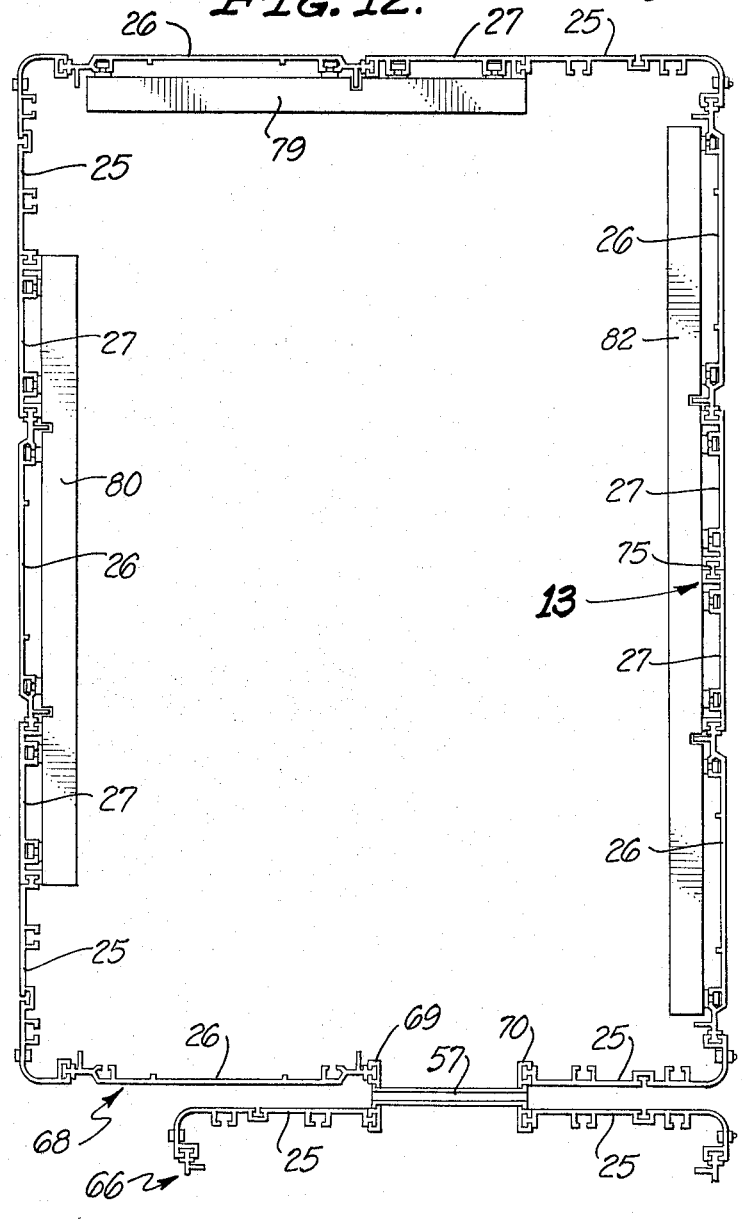
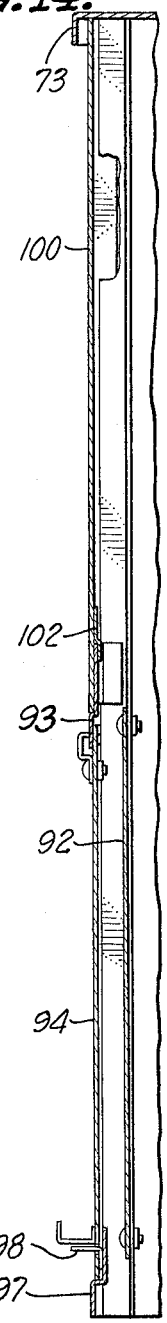
INVENTOR
REX E. STURDIVAN
BY HIS ATTORNEYS
HARRIS, KIECH, RUSSELL & KERN

United States Patent Office 3,286,133
Patented Nov. 15, 1966

3,286,133
METER PEDESTAL
Rex E. Sturdivan, Whittier, Calif., assignor to Zinsco Electrical Products, Los Angeles, Calif., a corporation of California
Filed Sept. 1, 1964, Ser. No. 393,581
15 Claims. (Cl. 317—104)

This invention relates to housings suitable for use with electrical equipment and particularly adapted for use with underground utility services. In underground utility service, typically electric power and/or telephone, the conductors are positioned in conduit buried in the ground while the meters, breakers, terminal panels and the like are mounted in some form of housing above the ground for ease of installation, maintenance, meter reading and the like. It is an object of the present invention to provide a new and improved housing for use in such installations.

It is an object of the invention to provide a new and improved housing for underground service which can serve as a splice box, a pull box, a conduit riser and a meter board and, if desired, as a breaker panel. A further object is to provide such a housing which can be combined with similar housings to provide service to any number of customer units, to provide for the combination of electric power and telephone service, to provide electric power transformers, metering and distribution in a single structure.

It is a particular object of the invention to provide such a housing in the form of a rectangular enclosure which is adapted for mounting on a base such as a concrete pad through which the conductor conduits rise. A further object is to provide such a housing in which the enclosure may be any desired height and incorporates a simple top cover for protection against the elements.

It is a particular object of the invention to provide such a housing in which the enclosure is formed of a plurality of panels with only three panel shapes required, the panels typically being aluminum extrusions obtainable in any length. A further object is to provide such a structure utilizing side panels and corner panels with the side panels being slidably removable providing access to the interior of the enclosure, providing for joining of additional enclosures and providing for variations in panel structure and form.

It is another object of the invention to provide such a housing incorporating distribution bus bars which function as electrical conductors and as structural members in the frame of the housing and as supports for the meters.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:
FIG. 1 is an isometric view of a single enclosure housing incorporating the teaching of the invention;
FIG. 2 is an enlarged top view of the housing of FIG. 1 with the cover removed;
FIG. 3 is an enlarged sectional view taken along the line 3—3 of FIG. 1;
FIG. 4 is a side view of an alternative embodiment of the housing showing a combination of two enclosures;
FIG. 5 is a side view of another alternative form of the housing showing a combination of two enclosures;
FIG. 6 is an enlarged sectional view taken along the line 6—6 of FIG. 4;
FIG. 7 is an enlarged sectional view taken along the line 7—7 of FIG. 4;
FIG. 8 is a sectional view taken along the line 8—8 of FIG. 7;
FIG. 9 is an enlarged sectional view taken along the line 9—9 of FIGS. 5 and 10;
FIG. 10 is a side view of another alternative form of the invention illustrating a plurality of enclosures with a distribution transformer in one of the enclosures;
FIG. 11 is an enlarged sectional view taken along the line 11—11 of FIG. 10;
FIG. 12 is a top view of the left portion of the structure of FIG. 10 with the cover removed;
FIG. 13 is an enlarged view of a portion of FIG. 12 indicated by the arrow 13; and
FIG. 14 is a sectional view taken along the line 14—14 of FIG. 10.

FIGS. 1, 2 and 3 illustrate the basic housing as used for metering and distribution of electric power service to four customers utilizing underground cable installations. An enclosure 20 may be mounted on a base 21 and may have a removable cover 22. Typically, the base 21 is a concrete pad set in the ground with one or more underground conduits 23 fixed therein, with the conduits opening into the lower end of the interior of the enclosure 20.

In the preferred form illustrated herein, the enclosure is formed of a plurality of panels which are slidably engageable with each other and which typically may be aluminum extrusions which can be cut off at any length to provide the desired height for the enclosure. Referring to FIG. 2, it is seen that the enclosure is formed of three different panels 25, 26, 27. Each of the four corners of the enclosure is formed of one of the corner panels 25. One edge 28 of the corner panel 25 has a T-shaped section running the length of the edge. The other edge 29 has a channel-shaped section which will mate with the T-shaped section. The cross-section shapes of the panels 25, 26, 27 are shown enlarged in FIG. 6. Referring again to FIG. 2, the side panels 26 have T-shaped sections at each edge thereof for sliding engagement with the channel sections of the corner panels 25, permitting vertical sliding insertion and removal of the side panels 26. The side panels 27 have channel-shaped sections at each edge thereof for sliding engagement with the T sections of the corner panels, permitting vertical sliding insertion and removal of the panels 27.

The corner panels 25 incorporate vertically disposed channel-shaped sections 32, 33 on the interior surface thereof for receiving bolts with T-shaped heads for supporting various members within the enclosure. A frame is provided within the enclosure for joining the corner panels together and for supporting electric circuit components within the enclosure. Typically, the frame may comprise aluminum angles 34 fixed to the corner panels at the channel sections 33 by bolts and nuts and aluminum angles 35 fixed in the channel sections 32 by bolts and nuts. The angles 35 at the bottom of the enclosure (FIG. 3) may have openings for receiving studs 36 projecting upward from the base 21 for fixing the enclosure on the base.

An insulator member 38 is mounted on the upper pair of angles 34 and another insulator member 39 is mounted on the intermediate pair of angles 34 (FIGS. 2 and 3). Three lengths of bus bar 40, 41, 42 are vertically disposed in spaced openings in the insulator members 38, 39. Four sets of meter jaws are mounted on the bus bars, two facing each direction, for supporting four plug-in meters. Conventional meter jaw units may be utilized and typically a unit comprises an insulator block carrying spaced spring-loaded jaws for receiving meter terminals, with each jaw having provision for connection to a bus bar or to a wire conductor. The insulator blocks of a meter jaw set are usually mounted on the neutral bus 41. The jaws 43 for the line side of the meter will be bolted to the respective line buses 40, 42. The jaws 44 for the load side of the meter will be spaced from the bus bars for connection of load conductors thereto. In the installation shown in FIG. 3, the load jaw members are positioned below the line jaw members. The insulator block 45 for the load unit of the lower set rests on the horizontal insulator member 39. The insulator block 46 for the line unit of the upper set engages the horizontal insulator member 38. By this arrangement, the three bus bars are fixed in position in the insulator members 38, 39. The line side wires are fastened to the bus bars by conventional means and the load side wires leading to each of the customers are connected to the jaw units by conventional means.

The cover 22 is perferably flanged to overhang the top of the enclosure for protection against the elements and may be held in place by conventional means as by pins 47 which engage openings in one edge of the cover and screws 48 passing through openings in the opposite edge. Conventional safety wiring and seals may be used on the screws if desired.

The enclosure may be fabricated at the factory or on the site as desired. The enclosure is installed by setting the fabricated enclosure in place on the base and clamping it thereto. The side panels are then lifted up out of the enclosure and the various electrical conductor connections are made. The side panels are then inserted and the cover is placed in position. When it is desired to connect power to one or more customers, the cover and the appropriate side panel 26 is removed, permitting insertion of a meter which closes the circuit to the customer. The side panel and cover are then replaced. Transparent openings 50 are provided in the panels 26 for meter reading.

The enclosure may be made any size, using the same standard components. The bus bars and the panels are cut to the desired length with the assembly and installation being the same for all heights of housing. Only three panel shapes are required, the panels on all four sides are slidably removable for ease of electrical installation and maintenance. The bus bars 40, 41, 42 function as electrical conductors and also function as mechanical supports for the meter jaw units and also function as a portion of the interior frame which makes the enclosure a rigid structure.

The modular construction of the housing permits a number of variations, some of which will be described herein. In making underground utility service installations, it is often desirable to provide both electric power and telephone service at a single point. In one modification of the standard housing, two corner panels 25 and a side panel 26 are combined to provide a second enclosure affixed to the enclosure of FIG. 1. The corner panel is preferably provided with a vertical channel 52 on the exterior surface thereof for slidingly receiving the T-shaped edge of another corner panel, as seen in FIG. 6. An enclosure 53 is affixed to the enclosure 20 by mounting the corner panels 25 of the enclosure 53 in the channel sections 52 of corner panels of the enclosure 20. One or more aluminum angles 54 may be mounted between the corner panels of the enclosure 53 for fixing the corner panels in position and for carrying electric components inside the enclosure 53. The panel 26 is slidably removable for access to the interior of the enclosure 53.

The side panels 26, 27 may be provided with channel sections 33 in the same manner as are the corner panels for receiving bolt heads or the like. In a conventional installation, these side panels will be installed so that the channel sections face inward. When a second enclosure is mounted on the side of the main enclosure, the side panel 27 (FIG. 6) may be removed, reversed and replaced to provide the channel sections 33 facing into the second enclosure for mounting equipment therein, illustrated as a bracket 55. This type of construction provides two completely isolated enclosures. If desired, the panel 27 may be removed providing two enclosures with a communication passage therebetween.

A singe cover may be provided for the housing of FIGS. 4 and 6, but it is preferred to provide a separate cover for each enclosure permitting any combination of enclosures to be produced without requiring custom-made covers. In the preferred construction illustrated in FIGS. 4, 7 and 8, an upward opening channel member 57 is positioned in the upper end of the enclosure 53 in openings 58 provided in the corner panels 25 of the enclosure 53 adjacent the corner panels 25 of the enclosure 20. The channel member 57 preferably has a flange 59 at each end overhanging the corner panel for maintaining the channel member in position. The downwardly turned flange of the cover 22 is positioned in the channel member, as seen in FIGS. 7 and 8. A similar cover 60 for the enclosure 53 has its downwardly turned flange also positioned in the channel member. This form of construction permits utilization of separate covers for each enclosure while providing for protection of the interior of each enclosure from the elements.

In another variation, two or more of the standard size enclosures 20 may be joined side by side to provide any desired amount of interior space. The side-by-side mounting of two such enclosures 66, 67 together with a larger enclosure 68 suitable for a transformer is illustrated in FIG. 10. The enclosures 66, 67 are formed in the same manner as the enclosure 20 of FIG. 1 except that the adjacent side panels 27 of the two enclosures are omitted, as shown in FIG. 11. A junction member 69, typically a length of aluminum extrusion having spaced parallel channel sections for receiving the T-shaped edge sections of the corner panels 25, is slidably inserted onto the adjacent edges of the two corner panel sections. A similar junction member 70 is provided at the opposite corner panel sections to define a communication space between the two enclosures 66, 67. A channel member 71, similar to the channel member 57 of FIG. 4, may be positioned in the upper ends of the members 69. 70 for receiving the flanges of the covers 22, 73 of the enclosures 66, 67 respectively. Any number of the enclosures may be joined in this manner.

The larger enclosure 68 may be formed of the same panels as the enclosure 20. The top view of FIG. 12 illustrates how the panels 25, 26 and 27 are assembled to provide the enclosure 68. The adjacent panels 27 are joined by an I section 75 which slides into the abutting channel edges, as best seen in FIG. 13. Pairs of corner panels 25 are joined by channel members 76 supported on brackets 77 mounted in the channels 32, 33 of the corner panels. A transformer 78 may be carried on the channels 76, with the transformer structure providing additional cross bracing within the enclosure.

One or more horizontal angles 79 may be used to join the adjacent panesl 26, 27 permitting sliding removal of the two panels as a unit (FIG. 12). A horizontal angle or bracket 80 may be used to join the three adjacent panels 27, 26, 27 and a bracket 82 may be used to join the four adjacent panels 26, 27, 27, 26. These slidably removable panel assemblies provide full access to the enclosure. The enclosure 66 is joined to the enclosure 68 in the same manner that the enclosure 67 is joined to the enclosure 66. A cover 84 may be attached in the same manner as the covers for the other housings. In this type of installation, the high-voltage line comes in underground an up into the enclosure 68 where it is connected to the primary side of the transformer. The secondary side of the transformer is directly wired to the bus bars of each of the meter enclosures joined to the transformer enclosure.

Doors or other means for access may be provided in the side panels, one such construction being shown in FIGS. 9, 19 and 14. Here the side panel 26 is removed and an adapter section 90, typically an aluminum extrusion, is slidably inserted into the channel edge of each corner panel 25. In the embodiment illustrated, a number of circuit breakers 91 are mounted on a plate 92 which in turn is supported on the adapter sections 90, as best seen in FIG. 9. A Z-shaped member 93 is fixed to the sections 90 adjacent the upper end of the plate 92 and a cover 94 is supported from the member 93 by hinges. The cover 94 may have flanges 95 which ride in channels 96 of the sections 90 to provide protection against the elements. Another Z-shaped member 97 may be fixed to the sections 90 at the lower end of the plate 92, with a tab 98 projecting through an opening in the cover 94 for receiving a lock or the like.

The space above the circuit breaker structure just described may be enclosed by a panel 100 which is formed from a panel 26 by removal of the T-shaped edges. The flanges 101 of the panel 26 (FIG. 6) ride in the channels 96 of the sections 90 in the same manner as the flanges 95 of the door 94. Clips 102 may be fixed to the lower end of the panel 100 for engaging the member 93 to hold the panel 100 in position. The cover 73 holds the upper end of the panel 100.

This circuit breaker type of construction may of course be used with one of the smaller enclosures 53 if desired. Such installation is shown in FIG. 5, where the hinged cover and breaker mounting plate are mounted at the upper end of the structure rather than at the lower end as shown in FIG. 10.

The particular shape and size of the enclosures are determined by the initial design of the cross section of the three panels. The configurations of these three panels are coordinated so that the various combinations of enclosures can be provided and can be joined together. While rectangular enclosures have been illustrated, it should be kept in mind that the enclosures could be square and the word "rectangular" as used in the claims is intended to include a square configuration.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a housing for a plurality of electric service meters or the like, the combination of:
   a rectangular enclosure adapted for mounting on a base and having plurality of panels, including corner panels and pairs of opposing side panels,
   with said panels having interengaging T and channel sliding engagement sections at the edges thereof for vertical sliding engagement of adjacent panels,
   with the corner panels having the same horizontal cross sections and vertically disposed sliding engagement sections on both sides thereof, and
   with the side panels of a pair having the same horizontal cross sections and with the panels of at least one pair having vertically disposed sliding engagement sections on at least one side thereof;
   laterally disposed frame members within said enclosure fixed to sliding engagement sections of said corner panels;
   a top for covering the upper end of said enclosure; and
   means for fastening said top in place on said enclosure.

2. In a housing for a plurality of electric service meters or the like, the combination of:
   a rectangular enclosure adapted for mounting on a base and having a plurality of panels, including corner panels and pairs of opposing side panels,
   with said panels having interengaging T and channel sliding engagement sections at the edges thereof for vertical sliding engagement of adjacent panels;
   laterally disposed frame members within said enclosure fixed to said corner panels;
   upper and lower insulators carried between pairs of said frame members in spaced parallel relation transversely within said enclosure;
   a plurality of bus bars positioned in said insulators in spaced relation;
   means for fixing said bus bars to said insulators with said spaced bars, upper and lower insulators and frame members providing a rigid frame for stiffening said enclosure;
   a top for covering the upper end of said enclosure; and
   means for fastening said top in place on said enclosure.

3. In a housing for a plurality of electric service meters or the like, the combination of:
   a rectangular enclosure adapted for mounting on a base and having a plurality of panels, including corner panels and pairs of opposing side panels,
   with said panels having interengaging T and channel sliding engagement sections at the edges thereof for vertical sliding engagement of adjacent panels;
   laterally disposed frame members within said enclosure fixed to said corner panels;
   upper and lower insulators carried between pairs of said frame members in spaced parallel relation;
   a plurality of bus bars positioned in said insulators in spaced relation;
   first terminal means fixed to each of said bus bars and engaging one side of said upper insulator and
   second terminal means fixed to each of said bus bars and engaging the opposite side of said lower insulator with said spaced bars, upper and lower insulators and frame members providing a rigid frame for stiffening said enclosure;
   a top for covering the upper end of said enclosure; and
   means for fastening said top in place on said enclosure.

4. In a housing for a plurality of electric service meters or the like, the combination of:
   a first rectangular enclosure adapted for mounting on a base and having a plurality of panels, including corner panels and pairs of opposing side panels,
   with said panels having interengaging T and channel sliding engagement sections at the edges thereof for vertical sliding movement of adjacent panels,
   with the corner panels having the same horizontal cross sections and vertically disposed sliding engagement sections on both sides thereof, and
   with the side panels of a pair having the same horizontal cross sections;
   first laterally disposed frame members within said first enclosure fixed to sliding engagement sections of said corner panels;
   a second enclosure adapted for mounting on a base and having a pair of said corner panels joined by a side panel interengaging sliding engagement sections,
   with an edge sliding engagement section of each second enclosure corner panel engaging an exterior sliding engagement section of a corresponding first enclosure corner panel with said first and second enclosures having a common side;
   second laterally disposed frame members within said second enclosure fixed to sliding engagement sections of said corner panels; and
   top means for covering the upper ends of said enclosures.

5. In a housing for a plurality of electric service meters or the like, the combination of:
   a first rectangular enclosure adapted for mounting on a base and having a plurality of panels, including corner panels and pairs of opposing side panels,
   with said panels having interengaging T and channel sliding engagement sections at the edges thereof for vertical sliding movement of adjacent panels,
   with the corner panels having the same horizontal cross sections and vertically disposed sliding engagement sections on both sides thereof, and with the side panels of a pair having the same horizontal cross sections;

first laterally disposed frame members within said first enclosure fixed to sliding engagement sections of said corner panels;

a second enclosure adapted for mounting on a base and having a pair of said corner panels joined by a side panel at interengaging sliding engagement sections, with an edge sliding engagement section of each second enclosure corner panel engaging an exterior sliding engagement section of a corresponding first enclosure corner panel with said first and second enclosures having a common side;

second laterally disposed frame members within said second enclosure fixed to sliding engagement sections of said corner panels;

an upward opening channel member carried in said second enclosure at the upper end thereof alongside said first enclosure;

a first top covering and overhanging the upper end of said first enclosure and positioned in said channel member;

a second top covering and overhanging the upper end of said second enclosure and positioned in said channel members; and means for fastening said tops in place.

6. In a housing for a plurality of electric service meters or the like, the combination of:

first and second rectangular enclosures adapted for mounting side by side on a base, each having a plurality of panels, including corner panels and side panels, with a gap in one side, and with the gaps of said enclosures providing communication therebetween, with said panels having interengaging T and channel sliding engagement sections at the edges thereof for vertical sliding movement of adjacent panels, and with the corner panels having the same horizontal cross sections and vertically disposed sliding engagement sections on the sides thereof;

laterally disposed frame members within each of said enclosures fixed to sliding engagement sections of said corner panels;

a first junction member having parallel sliding engagement sections engaging the edge sliding engagement sections of a pair of parallel disposed gap defining panels of said enclosures;

a second junction member having parallel sliding engagement sections engaging the edge sliding engagement sections of another pair of parallel disposed gap defining panels of said enclosures, with said junction members providing a closed passage between the interiors of said enclosures; and top means for covering the upper ends of said enclosures.

7. In a housing for a plurality of electric service meters or the like, the combination of:

first and second rectangular enclosures adapted for mounting side by side on a base, each having a plurality of panels, including corner panels, a pair of opposing side panels, and another side panel opposite a gap, with the gaps of said enclosures providing communication therebetween, with said panels having interengaging T and channel sliding engagement sections at the edges thereof for vertical sliding movement of adjacent panels, with the corner panels having the same horizontal cross sections and vertically disposed sliding engagement sections on the sides thereof, and with the side panels of a pair having the same horizontal cross sections;

laterally disposed frame members within each of said enclosures fixed to sliding engagement sections of said corner panels;

a first junction member having parallel sliding engagement sections engaging the edge sliding engagement sections of a pair of parallel disposed gap defining corner panels of said enclosures;

a second junction member having parallel sliding engagement sections engaging the edge sliding engagement sections of another pair of parallel disposed gap defining corner panels of said enclosure, with said junction members providing a closed passage between the interiors of said enclosures;

an upward opening channel member carried at the upper end of said junction members and extending therebetween;

a first top covering and overhanging the upper end of said first enclosure and positioned in said channel member;

a second top covering and overhanging the upper end of said second enclosure and positioned in said channel member; and means for fastening said tops in place.

8. In a housing for a plurality of electric service meters or the like, the combination of:

first and second rectangular enclosures adapted for mounting side by side on a base and having adjacent gaps providing communication therebetween, with each enclosure having a vertically disposed sliding engagement section adjacent each gap edge;

gap junction means including a first member with parallel sliding engagement sections engaging the sliding engagement sections of said enclosures at one edge of the gaps and a second member with parallel sliding engagement sections engaging the sliding engagement sections of said enclosures at the opposite side of the gaps, with said junction means providing a closed passage between the interiors of said enclosures; and top means for covering the upper ends of said enclosures.

9. In a housing for a plurality of electric service meters or the like, the combination of:

a rectangular enclosure adapted for mounting on a base and having a plurality of panels, including corner panels and pairs of opposing side panels, with said panels having interengaging T and channel sliding engagement sections at the edges thereof for vertical sliding engagement of adjacent panels, with the corner panels having the same horizontal cross sections and with the side panels of one pair having the same horizontal cross sections, and with one panel of the other pair including means defining an opening, a cover for said opening, and a circuit component support plate mounted in said opening;

laterally disposed frame members within said enclosure fixed to sliding engagement sections of said corner panels;

a top for covering the upper end of said enclosure; and means for fastening said top in place on said enclosure.

10. In a housing for a plurality of electric service meters or the like, the combination of:

a first rectangular enclosure adapted for mounting on a base and having a plurality of panels, including corner panels and pairs of opposing side panels, with said panels having interengaging T and channel sliding engagement sections at the edges thereof for vertical sliding movement of adjacent panels, with the corner panels having the same horizontal cross sections and vertically disposed sliding engagement sections on both sides thereof, and with the side panels of a pair having the same horizontal cross sections;

first laterally disposed frame members within said first enclosure fixed to sliding engagement sections of said corner panels;

a second rectangular enclosure adapted for mounting on a base and having a pair of said corner panels joined by a side panel at interengaging sliding engagement sections, with an edge sliding engagement section of each second enclosure corner panel engaging an exterior sliding engagement section of a corresponding first enclosure corner panel with said first and second enclosures having a common side, with said second enclosure side panel including means defining an opening, a cover for said opening, and a circuit component support plate mounted in said opening;

second laterally disposed frame members within said second enclosure fixed to sliding engagement sections of said corner panels; and top means for covering the upper ends of said enclosures.

11. In a housing for a plurality of electric service meters or the like, the combination of:

a rectangular enclosure adapted for mounting on a base and having a plurality of panels, including corner panels and pairs of opposing side panels, with said panels having interengaging T and channel sliding engagement sections at the edges thereof for vertical sliding engagement of adjacent panels, with the side panels of a pair having the same horizontal cross sections and with the corner panels having the same horizontal cross sections and vertically disposed sliding engagement sections integrally formed on the inner sides thereof;

laterally disposed frame members within said enclosure fixed to sliding engagement sections of said corner panels;

a top for covering the upper end of said enclosure; and means for fastening said top in place on said enclosure.

12. A housing as defined in claim 11 in which one of said side panels includes means defining an access opening and a cover mounted thereon for closing said access opening.

13. A housing as defined in claim 11 in which one of said side panels includes a pair of spaced vertical members, upper and lower cross members joining said spaced members defining a component spaced therebetween, and a cover for said space carried on one of said cross members.

14. In a housing for a plurality of electric service meters or the like, the combination of:

a rectangular enclosure adapted for mounting on a base and having a plurality of panels, including corner panels and pairs of opposing side panels, with said panels having interengaging T and channel sliding engagement sections at the edges thereof for vertical sliding engagement of adjacent panels, with the corner panels having uniform horizontal cross sections and vertically disposed sliding engagement channels on the inner sides thereof, and with the side panels of a pair having uniform horizontal cross sections and with at least one of said side panels having vertically disposed sliding engagement sections on one side thereof, with said one panel reversible with respect to adjacent corner panels to selectively portion the engagement sections thereof facing inwardly and outwardly;

laterally disposed frame members within said enclosure fixed to sliding engagement channels of said corner panels;

a top for covering the upper end of said enclosure; and means for fastening said top in place on said enclosure.

15. In a housing for a plurality of electric service meters or the like, the combination of:

a first rectangular enclosure adapted for mounting on a base and having a plurality of panels, including corner panels and pairs of opposing side panels, with said panels having interengaging T and channel sliding engagement sections at the edges thereof for vertical sliding movement of adjacent panels, with the corner panels having the same horizontal cross sections and vertically disposed sliding engagement sections on the exterior thereof, and with the side panels of a pair having the same horizontal cross sections;

a second enclosure adapted for mounting on a base and having a pair of said corner panels joined by a side panel at interengaging sliding engagement sections, with an edge sliding engagement section of each second enclosure corner panel engaging an exterior sliding engagement section of a corresponding first enclosure corner panel wth said first and second enclosures having a common side; and top means for covering the upper ends of said enclosures.

References Cited by the Examiner

UNITED STATES PATENTS

| | | | |
|---|---|---|---|
| 1,196,788 | 9/1916 | Klement | 317—121 X |
| 3,036,244 | 5/1962 | Brackett | 317—104 |

FOREIGN PATENTS 586,806  12/1958  Italy.

ROBERT K. SCHAEFER, *Primary Examiner.*

W. C. GARVERT, *Assistant Examiner.*